United States Patent [19]

Sunyich

[11] Patent Number: 4,883,948

[45] Date of Patent: Nov. 28, 1989

[54] CREDIT CARD STORAGE SYSTEM

[76] Inventor: Steven L. Sunyich, 402 E. Springhill Cir., North Salt Lake, Utah 84054

[21] Appl. No.: 338,740

[22] Filed: Apr. 17, 1989

Related U.S. Application Data

[63] Continuation of Ser. No. 170,310, Mar. 18, 1988.

[51] Int. Cl.⁴ .............................................. G06K 5/00
[52] U.S. Cl. .......................................... 235/382; 902/9
[58] Field of Search ............................. 235/382; 902/9

[56] References Cited

U.S. PATENT DOCUMENTS 4,648,327 3/1987 Toth et al. ............................. 902/9

*Primary Examiner*—Harold I. Pitts
*Attorney, Agent, or Firm*—Trask, Britt & Rossa

[57] ABSTRACT

A credit card operable storage system is provided. A plurality of credit card accessed and computer operated safes are communicatively linked to a respective branch computer, which is in turn communicatively linked to a central host computer (central host). The safes transmit use information (including credit card informaton) to their respective branch computers where the information is stored and periodically transmitted to the central host. The central host processes the use information into billing information which is electronically transmitted to a billing statement generating system.

20 Claims, 7 Drawing Sheets

CREDIT CARD STORAGE SYSTEM

This is a continuation of application Ser. No. 170,310, filed Mar. 18, 1988.

BACKGROUND OF THE INVENTION

1. Field

The present invention is directed to a system providing a secure container for the storage of items, the use of which is billed through a credit card billing system.

2. State of the Art

Credit cards are widely used for the purchase of goods and services. Typically, payment with a credit card is handled by a cashier. However, credit cards may also be used with automatic devices where no cashier is present. For example, certain gas pumps dispense gas automatically based on the input of a credit card.

SUMMARY OF THE INVENTION

The present invention provides a credit card operated storage system which comprises a container for the storage of items and a door associated with the container. A locking mechanism is associated with the door to selectively actuate between a locked position to lock the door in a closed position and an unlocked position to allow the door to open. A card reader and a user input means are also associated with the container. A processor is communicatively linked to the locking mechanism, the card reader, and the user input means. The processor is programmed to receive card information from the card reader, to receive user input from the user input means, to open the locking mechanism based on appropriate card information and user input, to develop use information, and to relay the use information to a billing development means. The billing development means is communicatively linked to the processor and is adapted to receive use information from the processor and to develop billing information.

In a preferred embodiment, the billing development means includes a branch computer communicatively linked to the processor. The branch computer is programmed to receive use information from the processor and to relay the use information to a central host computer. A central host computer (central host) is communicatively linked to the branch computer and is adapted to receive the use information from the branch computer and to develop billing information.

In one embodiment, the branch computer is programmed to store use information to disk storage and to relay periodically the use information to the central host. In another preferred embodiment, the central host is programmed to relay the billing information in digital form or otherwise to a billing statement generating system, such as a credit card clearinghouse.

Other embodiments are those in which the processor is programmed to receive and store the user-selected combination to open the safe, the combination being entered in at the user input means. The processor may be programmed to communicate with the branch computer through telephone communication means, e.g. telephone lines, satellites, etc. or through coaxial cable TV lines. Also, the branch computer may be programmed to communicate with the central host through telephone communication means.

In another embodiment, the processor is adapted to be accessed and programmed from the central host. Another embodiment includes a user feedback device, such as a visual display or voice generating system (such as a voice synthesizer) for providing selected messages (such as advertising messages) to a user. The processor may be programmed so that these messages are stored and so that messages may be received from the branch computer or from the central host. In other words, the messages may be changed directly from the central host or from a branch computer.

In another embodiment, the invention provides a method of providing a credit card operated safe. This method includes providing a safe with an associated locking mechanism, a card reader, a user input device, and a programmable processor, which is communicatively linked to the locking mechanism, the card reader, and the user input device. The method further includes programming the processor to receive card information from the card reader, to receive user input from the user input device, and to open the safe based on appropriate card information and user input.

DETAILED DESCRIPTION OF THE ILLUSTRATED EMBODIMENT

The preferred embodiment of a safe system of the present invention is designed to be used in hotels or motels, one safe being placed in each room. However, the system described may also be used in other environments such as airports or ski resorts, etc.

A user first obtains access to the safe by running a credit card through a magnetic card reader associated with the safe. The user then programs a combination, which the user selects, into the safe. The user can then open the safe whenever he needs to with his user-selected combination. Use of the safe is charged on a per diem basis; the user is billed on his credit card billing statement.

In the preferred embodiment, each safe has a modem and is communicatively linked through the phone lines to a branch computer which is located somewhere in the hotel. Each safe transmits use information to the branch computer, and the branch computer stores this use information. Use information includes credit card information (including personal identifying information about the user) and the time period for which the safe was used.

Each branch computer (one per hotel) has a modem by which it communicates with the central host system once each day and transmits to the central host the use information it has received from each of the safes in its respective hotel during the previous 24 hour period. The central host then processes this use information to develop billing information. The billing information includes the information necessary to develop billing statements to be sent to the user. The central host then transmits the billing information directly to a company or system, such as a credit card clearinghouse, which then processes the information and sends out billing statements. Preferably, the central host transmits the billing information electronically in digital form to the credit card clearinghouse, avoiding the inconvenience and potential errors in paper transmission.

Figure 1:
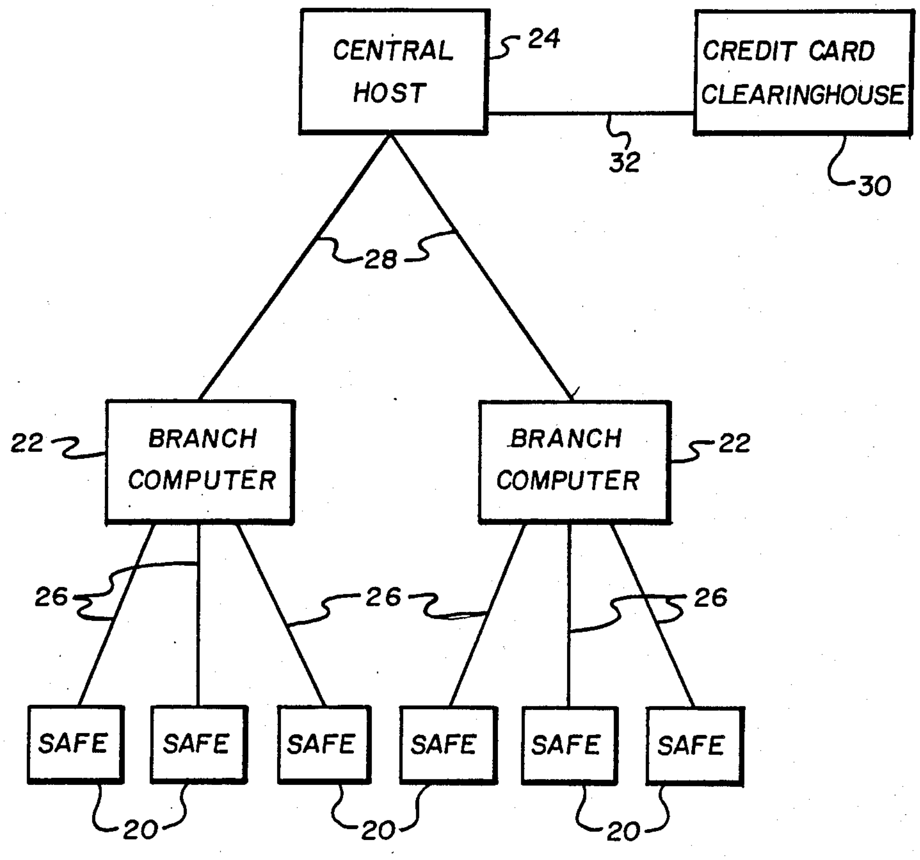
FIG. 1 is a block diagram of a credit card safe system of the invention.

Referring to FIG. 1, basic components of the preferred embodiment of the invention are a plurality of safes 20, a plurality of branch computers 22, and a central host 24. Each safe 20 is communicatively linked with a branch computer 22 by means of phone lines 26. Typically, one branch computer is located in each hotel. Each safe 20 includes a modem by which it communicates with a branch computer 22. Typically, the phone system in the hotel will be a private branch exchange (PBX). The branch computer 22 also has a modem by which it communicates with the central host 24 through phone lines 28.

The branch computer 22 is programmed to initiate contact with the central host 24 every twenty-four hours to relay to the central host 24 the use information it has received from its associated safes during the past twenty-four hour period. The central host 24 processes the use information it has received from the branch computers 22 to develop billing information. The central host 24 electronically transmits billing information in digital format to a credit card clearinghouse 30 through phone lines 32.

Figure 2:
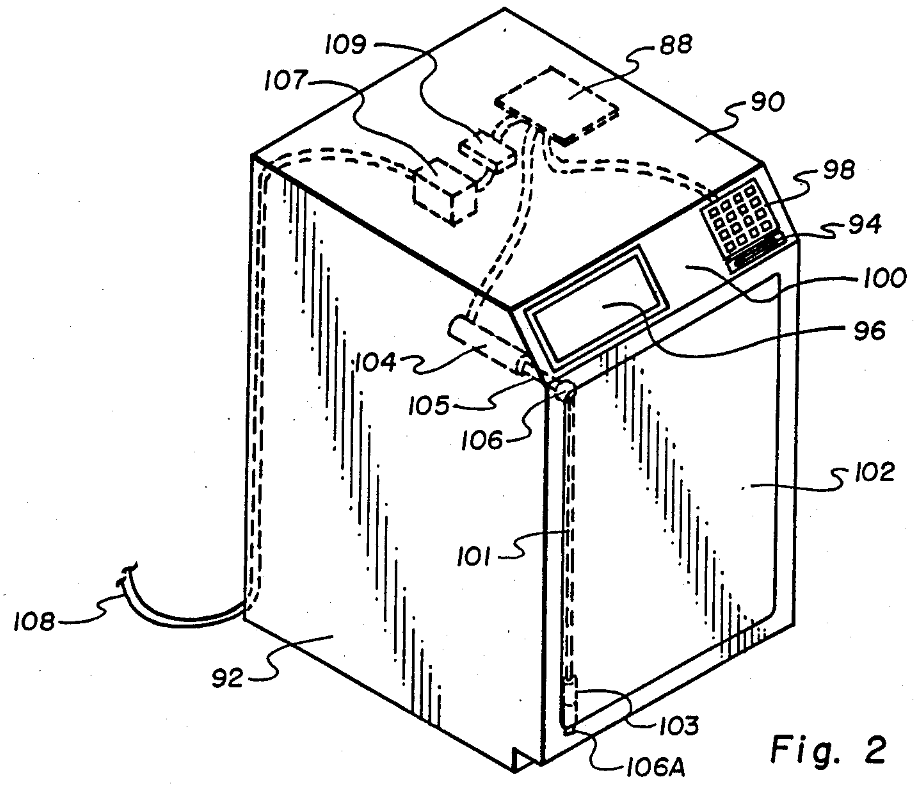
FIG. 2 is a perspective view of a safe of the invention.
Figure 3:
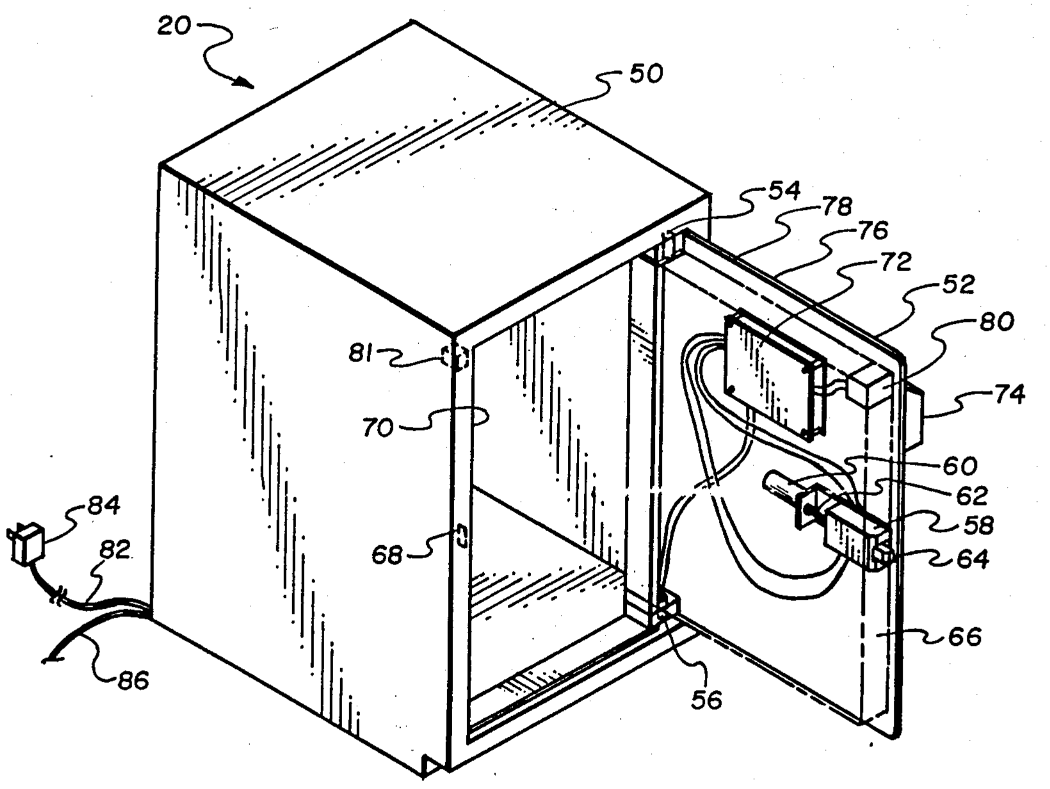
FIG. 3 is a perspective view of an alternative embodiment of a safe of the invention.

The physical structure of safe 20 is now described in reference to FIG. 2. Safe 20 includes a secure container 50 to which door 52 is hingingly attached at hinges 54 and 56. Container 50 and door 52 are preferably formed of steel and are constructed in a well-known manner to constitute a secure safe for the storage of valuable items. Attached to the inside of door 52 is a locking mechanism 58. Locking mechanism 58 preferably includes a motor 60 having a rotating shaft 62. Shaft 62 is associated by means of a screw drive to a bolt 64. Motor 60 is bi-directional so that it may turn in one direction to make bolt 64 extend out of face 66 of door 52 or to rotate in the opposite direction to retract bolt 64 back to its flush position with face 66 as shown in FIG. 3. Locking mechanism 58 may also be a solenoid; however, motor driven locking mechanisms are preferred as being more reliable and secure. With the door in its closed position, bolt 64 may be extended by motor 60 into latch 68 (shown in phantom) firmly secured to inside panel 70 of container 50.

Control of locking mechanism 58 is regulated by a processor 72, attached to the interior of door 52. Processor 72 is the "brain" of the safe 20 and performs several functions relating to the operation and use of safe 20. It is not necessary that the processor be physically connected to the safe. For example, in an alternative embodiment, the processor may be coterminous with the branch computer, with only the electronic "hardware" (such as the card reader, locking mechanism, visual display, etc.) being physically connected to the safe. However, physically locating the processor in or with the safe is deemed to be advantageous. One advantage is that no special wiring need be made between the safe and the branch computer or between the safe and the central computer; the safe accesses these other computers via existing phone lines.

Attached to the outside of door 52 is a magnetic card reader 74, which reads credit cards and relays the information on the card to processor 72. A light-emitting diode display 76 (not shown) is also attached to the outside of door 52 and linked with processor 72. Display 76 is typically a 16-character, vacuum fluorescent, 7-axis display. Alternatively, display 76 may be adapted to display characters and graphics, such as a back-lit dot matrix LCD graphic display, with, for example, 40 characters on 4 lines. Processor 72 gives prompts or messages to a user via display 76. Display 76 therefore serves as a user feedback means or device. An alphanumeric keypad 78 (not shown) is also attached to the outside of door 52 and linked with processor 72, by which a user may enter information to be relayed to processor 72. Keypad 78 therefore serves as a user input means or device. Keypad 78 is typically a 16-key, x-y matrix keypad.

An magnetic detector door switch 80 is attached to the inside of door 52 as shown, and is electronically linked to processor 72 to indicate to processor 72 when door 52 is closed. Magnetic door switch 80 detects when door 52 is closed by sensing the proximity of a magnet 81 located in panel 70 as shown. A magnetic switch is deemed to be preferable to a mechanical switch because a mechanical switch may be accidentally actuated by a user. A power cable 82 supplies power to processor 72. Processor 72 uses DC power; therefore, an AC to DC converter 84 is connected to cable 82. Converter 84 connects to a standard AC outlet. Processor 72, which includes a modem, is communicatively linked to a branch computer by means of phone line 86. Both power cable 82 and phone line 86 pass through a hole in hinge 56, through the interior of door 52, and to processor 72.

FIG. 3 illustrates another embodiment of a safe of the invention. In the embodiment of FIG. 3 an in-safe processor 88 is mounted within a secure cover 90 on top of container 92. Card reader 94, display 96, and keypad 98 are mounted on front face 100 of cover 90. Display 96 is shown to be a graphics display.

In the embodiment of FIG. 3, a locking mechanism such as locking mechanism 58 in FIG. 2 is not used. A shaft 101 (shown in phantom), such as a round, steel rod, is vertically and slidingly mounted in door 102 as shown. A spring 103 is mounted to shaft 101 and acts to urge shaft 101 upward. When shaft 101 is urged upward to its highest position within door 102, the upper end of shaft 101 is flush with the top of door 102, and the lower end of shaft 101 is flush with the bottom of door 102. At this time, door 102 is free to open. A motor 104 is electronically linked to processor 88. Motor 104 has a rotating shaft 105 to which is connected a camming device 106. The camming device mechanically interacts with the top of shaft 101.

Processor 88 actuates motor 104 to rotate in one direction to cause camming device 106 to urge shaft 101 downward. When shaft 101 is urged downward, it enters a latch 106A to cause door 102 to be in a locked position. When processor 88 actuates motor 104 to rotate in the opposite direction, camming device 106 allows shaft 101 to be biased upward by spring 103 so that the bottom of shaft 101 becomes flush with the bottom of door 102, allowing door 102 to open. Removing the locking mechanism, i.e., motor 104, from the door of the safe increases security by avoiding the possibility that the locking mechanism may be tampered with by, for example, drilling holes through door 102.

In FIG. 2 an AC adaptor 84 is depicted for connection with the power supply of processor 72. However, rather than tapping the power off a 110-volt power supply, the safe of FIG. 3 taps power from the telephone system. Hotel PBX phone systems typically run on a 50-volt power source. Therefore, a small amount of current, in the neighborhood of 10–20 milliamps, may typically be tapped off. In FIG. 3, a DC to DC converter 107 is attached to line 108 (which is typically the hotel PBX phone line) and charges a battery 109, serving as a backup power supply for the system. In a total power failure, the system continues to operate in a minimal power drain mode in which the door may be opened and closed and in which other minimal functions of operation may continue. When the power is restored through the telephone line, the charging system then recharges the batteries. Typically, nickel cadmium batteries are used. The embodiment of FIG. 2 may also include a charger and a backup battery power supply for operation of the safe during a power failure.

Alternatively, line 108 may be a coaxial video television cable. Information is transmitted to the branch computer through such a video cable, which is typically already installed in the hotel room. The video cable power supply is also an acceptable source of current to power the safe.

Figure 4:
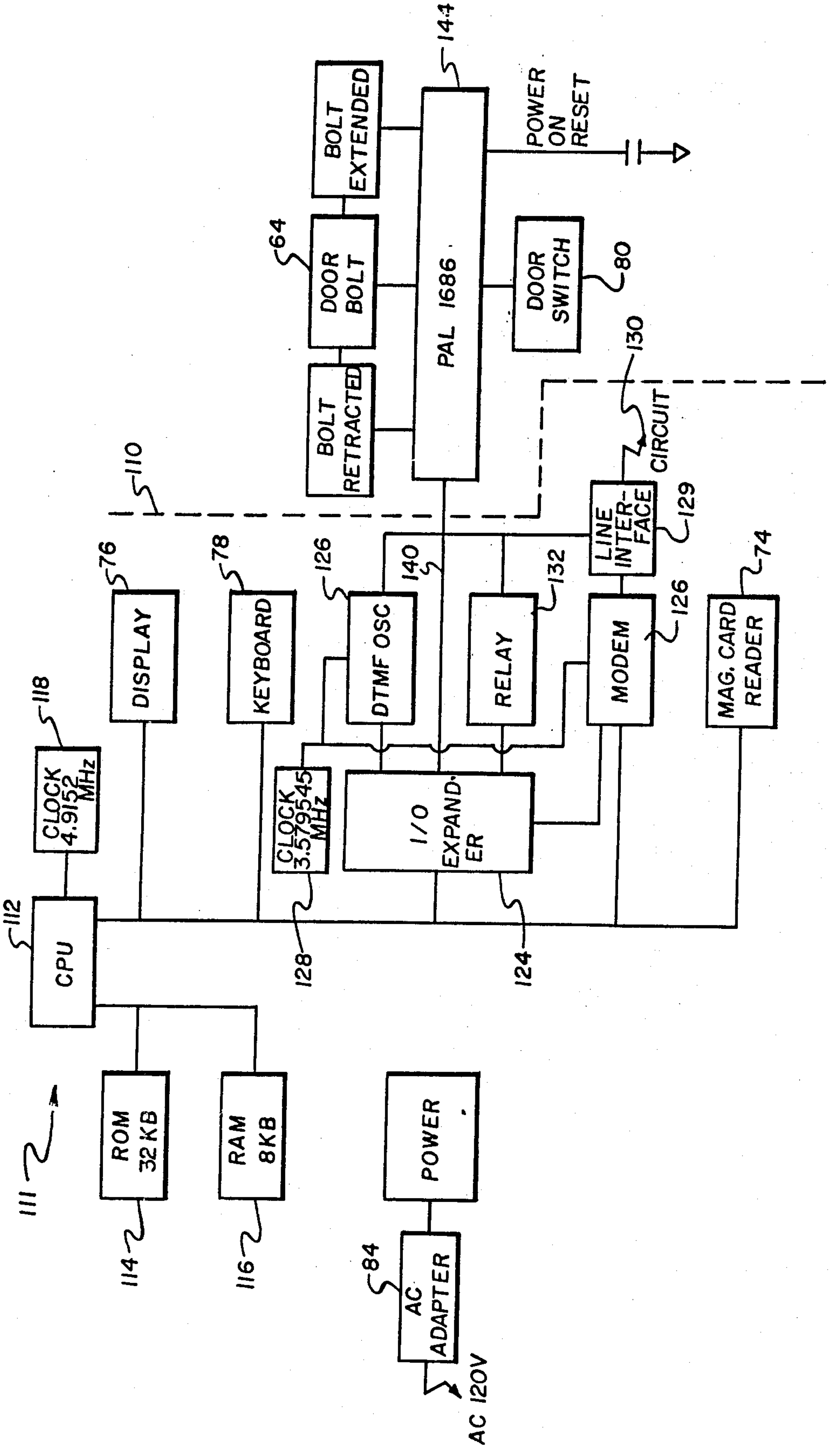
FIG. 4 is a block diagram of the system configuration of a processor of the invention.
Figure 5:
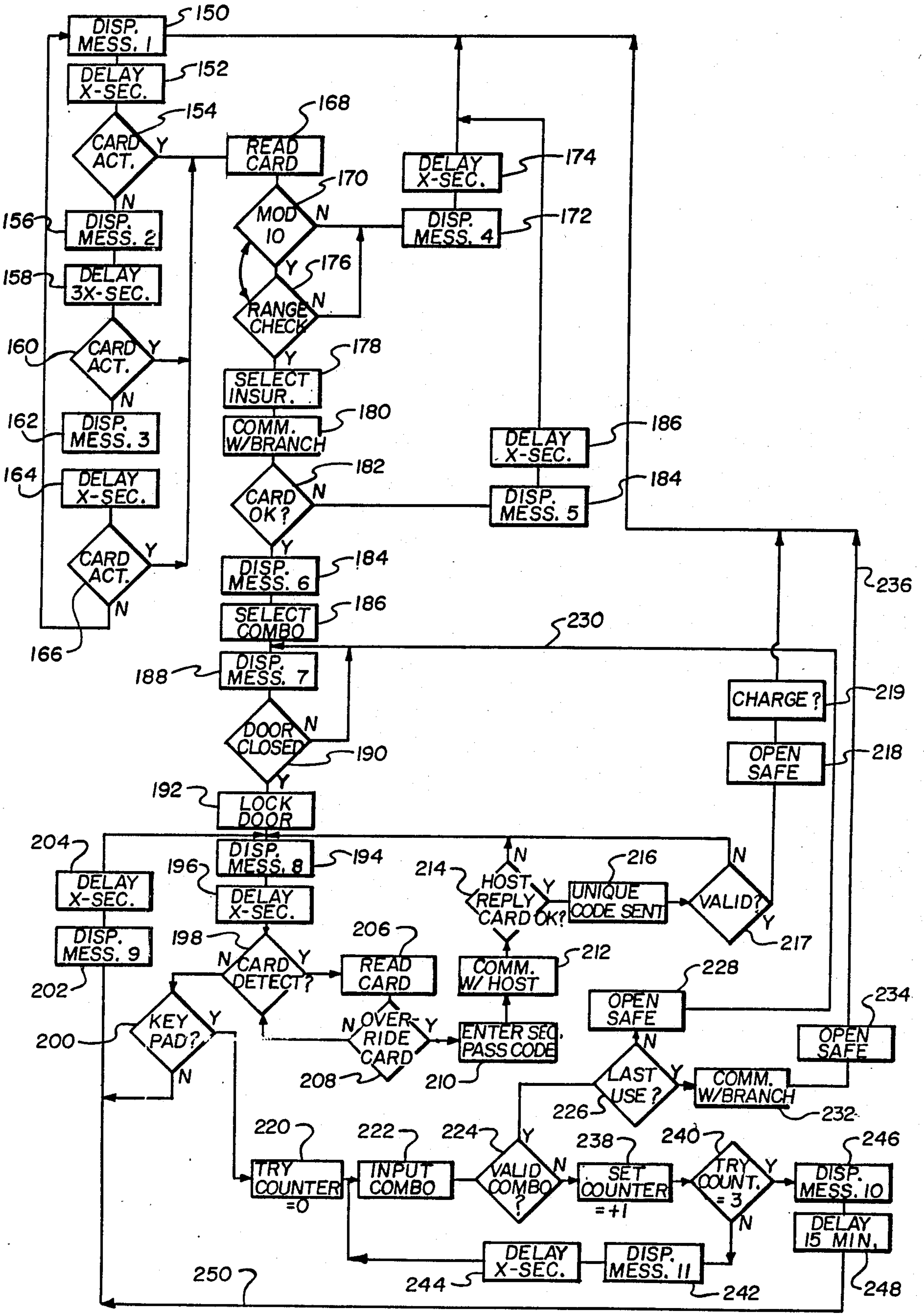
FIG. 5 is a flowchart of a computer program used to operate a processor of the invention.

FIG. 4 is the system configuration for processor 72. The majority of processor 72 is an "off the shelf" programmable credit card reader, specifically model CAT 95, available from OMRON, Inc. of Japan (U.S. headquarters in Chicago, Ill.). The items to the left of dotted line 110 in FIG. 5 are the system configuration for the CAT 95. The CAT 95 (enumerated 111 in FIG. 4) includes processing hardware and various other hardware items such as a visual display, keypad, modem, and a magnetic card reader, etc., as described hereafter. Components of the processor 72 to the right of dotted line 110 may be referred to as a bolt board 113. Bolt board 113 is a component constructed to associate the CAT 95 with the locking mechanism 52 to extend or retract bolt 64.

The heart of the processor is the central processing unit (CPU) 112 which is a HD6301XO chip. CPU 112 is in communication with a 32 kilobyte read only memory (ROM) 114 and with an 8 kilobyte random access memory (RAM) 116. ROM 114 is an erasable programmable read only memory (EPROM). RAM 116 is adapted for memory storage. The CPU, ROM and RAM communicate and associate with each other in a manner which is well known in the art. Also associated with CPU 112 is a clock 118, which emits oscillations at 4.9152 megahertz. CPU 112 interfaces with clock 118 in a manner which is well known in the art for various time dependent functions.

CPU 112 is also linked with light emitting diode display 76. CPU 112 associates with and gives commands to the display 76 in a manner which is well known in the art. Also linked to the CPU 112 is keypad 78. Through keypad 78 a user can input data such as a user-selected safe combination, subsequent input of the same combination for opening the safe, response to prompts given, and certain programming instructions, etc.

Also linked to the CPU is an input/output (I/O) expander 124. I/O expander 124 allows CPU 112 to communicate with other elements of the processor in a manner which is well known in the art. I/O expander 124 is linked to a dual tone multiple frequency oscillator (DTMF OSC) 126 which produces the various tones necessary to connect with other computers through the phone lines. DTMF OSC 126 is linked to a clock 128, which generates oscillations at a frequency of 3.579545 megahertz. The DTMF OSC uses the frequencies emitted by clock 128 to generate the dial tones.

I/O expander 124 is also linked to a modem 126. Modem 126 is linked to clock 128 and DTMF OSC 126. Modem 126 is used to communicate with other computers through line interface 129 and line 130, which is connected to the phone lines. A switching between DTMF OSC 126 and the modem 126 is accomplished by means of relay 132. CPU 112, DTMF OSC 126, relay 132, and modem 126 associate in a manner well known in the art to relay and receive information to and from other computers.

When locking mechanism 58 is to be actuated to either extend or retract bolt 64, a signal is sent from CPU 112 through I/O expander 124 via line 140 to bolt board 113. In the CAT 95 (111), a buzzer is removed from line 140 and line 140 is connected appropriately to bolt board 113. The central element of bolt board 113 is a PAL 1686 chip 144. PAL chip 144 is connected to door switch 80 so as to not extend bolt 64 unless door 52 is closed.

The program for control of processor 72 is programmed into a ROM 114 by means of a "EPROM burner." A description of the program "burned" into EPROM 114 is made in reference to FIG. 5, which is a flow chart of the program. A description of the exact communication between CPU 112, EPROM 114, RAM 116, clock 118, display 120, keypad 122, I/O expander 124, magnetic card reader 125, and other components of processor 72 are not explicitly described. Only the program will be discussed; the program or "software" functions with the "hardware" in a manner which is well known in the art.

At step 150, the display 120 and card reader 125 are activated and keypad 122 is disabled. At this time, the program is in its "insert card mode." If a person, for example, a child, were to touch buttons on keypad 78, no response would be given. Step 150 executes display (on display 76) of Message One, which includes an enticement to use the safe and statement of the daily rate for such usage. Messages, such as Message One, are stored in RAM 116. Step 152 executes a delay of a preselected 1× number of seconds (the number corresponding to x also being stored in RAM 116). The program then runs test 154 to ask whether there is any card activity at magnetic card reader 74. If there is no card activity at card reader 74, step 156 executes display of Message Two, which is a message to the user to insert his credit card. Step 156 then executes a delay of 3x numbers of seconds. During this 3x delay, at test 160, the program awaits any card activity. If again there is no card activity, step 162 executes the display of Message Three, which is an optional message, such as an advertising message selected by the hotel. Advertising messages may include, for example, advertisements of activities in the hotel lobby or "specials" at the hotel restaurant. Step 164 then executes a delay of 1x seconds, during which the program looks for card activity at test 166. If again there is no card activity, the program loops back to step 150 to again display Message One.

If there is any card activity at steps 154, 160 or 166, step 168 executes a read card command which allows information to be read from the user's credit card at magnetic card reader 74. The program then executes a MOD 10 test 170, which is a standard test to determine if the card is a standard American Banking Association (ABA) type card. If the MOD 10 test 170 is negative, i.e., if the information from the credit card is incomplete, step 172 executes a display of Message Four, which is that there is a card error. Step 174 then executes a 1x second delay. The program then returns to step 150 to display Message One.

If the MOD 10 check is positive, the program executes a range check test 176 to determine if the number on the credit card is within the range which the safe will accept. A range of acceptable credit card numbers is stored in RAM 116. One range of possible card numbers includes the range of credit cards which the hotel or the central host operators have determined are from reliable credit card companies. Another number is reserved for a "courtesy card," given to hotel management when it is desired that use of the safe not be billed. The courtesy card may be used, for example, with persons who do not have a credit card. If range check 176 is negative, the program loops to step 172 to display Message Four (card error). If range check 176 is positive, step 178 executes a prompt at display 120 to ask the user whether he desires insurance. The user's response is then stored.

Step 180 then establishes communication with the branch computer to ask the branch computer whether the card is O.K. Test 182 is activated by the response from the branch computer whether or not the card is O.K. If test 182 is negative, step 184 executes display of Message Five, which is a message to the user that the card which has been used is not good, and that it will not be accepted. Step 186 executes a delay of 1x seconds. The program then loops back to command 150.

If test 182 is positive, step 184 executes display of Message Six, which is a message to the user to select a combination. At step 186, the user selects a combination and keys this combination into keypad 78. The selected combination is stored in RAM 116. Step 188 then executes display of Message Seven, which is an instruction to the user to close the door on the safe.

The program then runs test 190, based on data it receives from switch 80 whether or not the door has been closed If the door is not closed the program loops back to step 188 to again display Message Seven. If test 190 is positive, step 192 executes a command to PAL chip 144 to extend bolt 64 so as to lock door 52 shut when PAL chip 144 recognizes that the door is closed, based on information from the door switch 80. Step 194 then executes display of Message Eight, which is that the safe is now in use. The program is then in its "in use mode" during which a user may access and open the safe by entry of the previously selected and stored combination.

Step 196 then executes a delay of 1x seconds. Test 198 or 200 may then be activated from either card reader 74 or keypad 78, respectively. If there is activity at card reader 74, test 198 will be positive. If there is keypad activity before card activity, test 198 is negative and test 200 will be positive. If there is neither card activity nor keypad activity, both tests 198 and 200 are negative, and the program loops to step 202, to display Message Nine. Message Nine is optional and may be the same as Message Three, e.g., relating to advertisements the hotel chooses. After Message Nine, step 204 executes a 1x second delay. The program then loops back to step 194.

If after step 196 a card is detected at test 198, step 206 executes reading of the card. Test 208 then compares the information from the card against data stored in RAM 116 as to whether or not the card is an override card. An override card is provided to the hotel management to be used in the event a user (guest) forgets his self-selected combination. The use of such an override card is described hereafter. The number of the override card is stored in RAM 116. If test 208 is negative, the program loops back to test 198 to await for card activity or key pad activity as described above.

If test 208 is positive, in other words, if the card is a valid override card, step 210 produces a message at display 76 for the user to enter a security pass code. Step 212 then executes communication with the central host. The program communicates the TID number (terminal identification number), a log-on code, the override card number, and entered pass code. Test 214 asks the central host if the override card and the pass code are valid. If the override card is not valid, the central host sends back an invalid card message. Test 214 will therefore be negative, and the program executes display of the message "invalid code." The program then returns to step 194 ("in use" mode). If the override card is valid but the pass code is incorrect at test 214, the central host sends an invalid code signal. The program then displays a message "invalid code" and loops back to step 194.

If test 214 is positive, i.e., if both the override card and the pass code are correct, at step 216 the central host sends back to the safe a secret unique code. The program then runs test 216 to see if that is the correct unique code stored in ROM 114. If it is, step 218 executes retraction of bolt 64 and a display of the message "open door." Step 219 executes a prompt at display 76 to ask whether the use of the override card will be billed. The hotel personnel using the override responds to the question at keypad 78, and the response is stored in memory. If test 217 is negative, in other words, if the unique code received from the central host is incorrect, the program loops back to step 194 ("in use" mode).

Referring now again to test 200, if test 200 is positive, in other words, if the keypad 122 is used, step 220 sets a counter equal to zero. At step 222 the combination is received from the keypad. Test 224 asks whether the combination is valid, in other words, whether the combination is the same as that selected in step 186. CPU 112 compares the entered combination (entered at keypad 78) with the user-selected combination previously stored in RAM 116.

If test 224 is positive, in other words, if the valid combination has been entered, step 226 executes a message on display 120 to ask the user if this is his last use of the safe. If test 226 is negative, in other words, if the user inputs an "N" for no, step 228 executes retraction of bolt 64. The program then loops back via a path 230 to step 188 to again execute display of Message Seven, which is the message to close the door.

If test 226 is positive, in other words, if the user inputs a "Y" for yes to answer the question whether it is the last use, step 232 executes communication with the branch computer. The TID number, the log-on code, the combination used, and an "E" message for ending is then transmitted to the branch computer. Step 234 then executes opening of locking mechanism 58 and the display of a message to open the safe. The program then returns via path 236 to step 150. At step 150, the program is again in its "insert card mode."

If test 224 is negative, in other words, if an invalid code is entered, step 238 adds one to the counter. Test 240 then asks if the counter now totals three. If this has been the first invalid combination, the counter will only read one, and therefore the response to test 240 will be negative. Step 242 then executes display of Message Eleven, which is to reenter the combination. Step 244 then executes a delay of 1x seconds.

The program then loops back again to step 222 (input combo) and then to test 224, to again test as to whether the combination is valid. If the combination is valid, the program moves to test 226 as previously described. If the combination is again invalid, the counter is again increased by one at step 238. Test 240 again asks if the counter equals three. This time the counter will be equal to two, and therefore test 240 will again be negative. The program then loops back through steps 242, 244, and 222, to again allow the user to enter a combination. If an invalid combination is again entered, test 224 will be negative, step 238 will add one to the counter, the counter will equal three, and test 240 will this time be positive.

If test 240 is positive, step 246 executes display of Message Ten, which is that the user must wait 15 minutes to try again. Step 248 creates a delay of 15 minutes. The program then returns via path 250 through steps 202, 204 and again to step 194.

A dialing sequence referred to as a "check-in sequence" is now described. Each safe is programmed to check in with its respective branch computer periodically, regardless of safe usage. The safes may also be programmed to check in directly with the central host. Each safe is set to dial out at a specific time in the same way each branch computer is set to call the central host periodically, as described hereinafter. When the safe establishes contact with the branch computer, the safe transmits its TID number and a message as to whether the safe is in use. If in use, the safe sends a "U." If the safe is not in use, it sends a "N." The computer acknowledges that it has received the message and sends any new advertising instructions or new commands to the safe to be stored in RAM 116.

Figure 6:
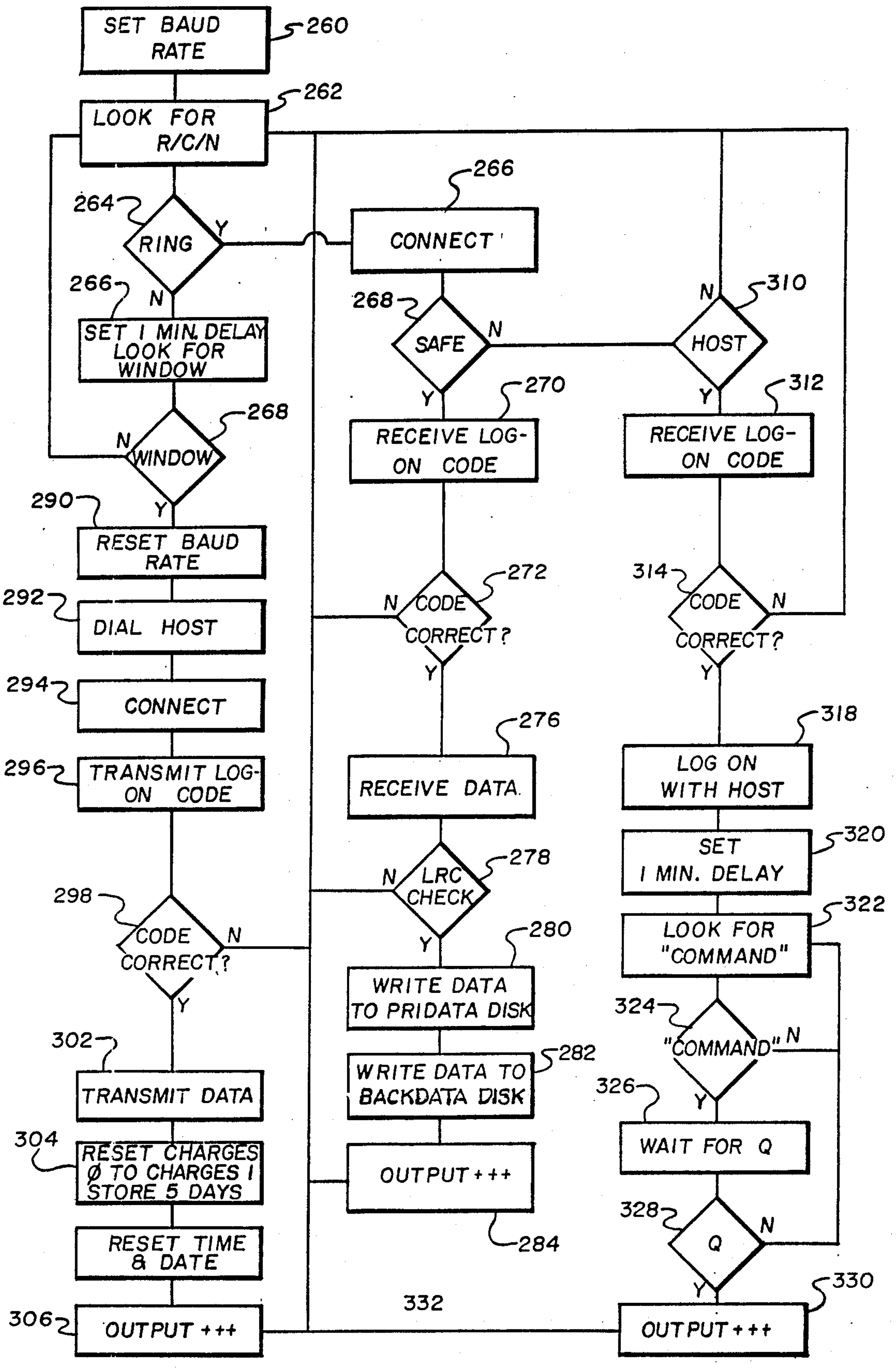
FIG. 6 is a flowchart of a computer program used to operate a branch computer of the invention.

A description of the program used in the local host or in-hotel host computer (branch computer) 22 is made in reference to FIG. 6. First, at step 260, the program sets up the baud rate, which determines the communication rate with the safes and the central host. The baud rate is variable. At step 262, the program is in the "looking for a ring/connect/no carrier (R/C/N)" mode in which it is looking for a ring to come in from one of the safes in the hotel. The looking for R/C/N mode is a standard modem function. If test 264 is positive, in other words, if a ring is received, step 266 executes connection with the calling computer with a modem in the branch computer.

After the connection at step 266, test 268 determines whether or not the incoming call is from one of the safes. Test 268 is based on TID numbers transmitted from the safes or the central host. If test 268 is positive, in other words, if the incoming call is from a safe, step 270 receives a log-on code from the safe. The program then runs test 272 to ask itself if the log-on code is correct. If the log-on code is incorrect, test 272 is negative, and the program loops back to step 262, looking for R/C/N. If test 272 is positive, step 276 executes reception of the data string from the safe.

The program then runs test 278, which is a longitudinal redundancy check (LRC) to determine if the data string has been properly transmitted. LRC check 278 tests if the sum of the digits in the data string equals a sum number transmitted by the safe at the end of the data string. If the data string doesn't have longitudinal redundancy, the program will send an LRC "not OK" message back to the safe. The safe will try six times to transmit the data string. If the safe has not communicated the information correctly after six times, LRC check 278 is negative, and the program loops back to step 262. The safe then disconnects and sets itself to redial and resend the information.

If LRC check 278 is positive, the program proceeds to step 280, in which the incoming data from the safe is written into the primary disk. The program cycles through steps 276 to 282 until all data is received. At step 282, the data is written onto a backup disc drive. Step 284 executes output of a +++ which disconnects the system from line. The program then loops back to R/C/N, step 262.

Returning now to the left branch of the program of FIG. 6, if after step 262, test 264 is negative, in other words, if no ring is received, step 266 sets a one-minute delay. At test 268 the program asks itself if the system is within its preprogrammed "window." The window is the time during which the branch computer is programmed to dial up and transmit information to the central host. If the branch computer is not within its window, the program returns to step 262 and waits for an R/C/N to come in from either a safe or the central host. If test 268 is positive, in other words, if the system is within its time window, step 290 sets the appropriate baud rate to transmit data to the central host.

Step 292 executes dialing to the central host. Step 294 executes connection with the central host and transmission of the branch computer TID number. Step 296 transmits the log-on code.

The program then runs test 298 to ask if the code is correct. If test 298 is negative, the program returns to step 262. The program then runs through steps 264, 266, 268, 290, 292, 294, 296 and 298 again each minute in an attempt to log on with the central host. Generally, the branch computer has a 20-minute window during which it attempts to log on with the central host. If the test 298 is positive, step 302 executes transmission of the data from the branch computer to the central host.

The program then executes step 304—"reset charges 0 to 1, store 5 days." Each day as the safes call in and transfer data to the branch computer, the branch computer stores the information in a charges log. The branch computer stores the information in the 0 log until the time it transmits the data to the central host. After the branch computer has transmitted the data to the central host and the central host has acknowledged receipt of the information, the branch computer changes the charges 0 to charges 1, charges 1 to charges 2, charges 2 to charges 3, and so forth to charges 5. Within the branch computer there are five days worth of information that are stored. Each new day the branch computer erases the last day and moves charges 4 to charges 5. If the central host were to lose communication with the branch computer for any reason, there would be five days to solve whatever problem exists before information is lost. Step 305 executes an update of the date and time of the branch computer to be the same as the date and time of the central host. This correlation of dates and times avoids errors that may arise due to differing time zones. Step 306 outputs +++ which disconnects and hangs up the line. The program then loops back to step 262, looking for R/C/N.

The branch on the right-hand side of the program of FIG. 6 is now described. If test 268 is negative, in other words, if the ring received by the hotel system is not from a safe, the program runs test 310 to ask whether the central host is calling. The branch computer determines whether it is a safe or the central host based on the TID number sent from the safe or the central host. Test 310 looks for the TID number coming in from the central host. If the TID number is not received, test 310 is negative and the program loops back to step 262. If the TID number is received from the central host, test 310 is positive and the log-on code is received at step 312. The system then runs test 314 to ask if the log-on code is correct. If test 314 is negative, the program loops back to step 262. If test 314 is positive, step 318 executes a log on with the central host.

Step 320 then sets a one-minute delay to allow the program to stay on-line with the central host, while step 322 is looking for a command from the central host. The delay at step 320 can be set at variable amounts, for example, ten or fifteen minutes. Test 324 asks whether a command has been received from the central host. At step 324, the branch system stays on line with the central host, and each minute it asks itself whether it is receiving any commands. If no command is received from the central host, the program loops back to step 322 to again look for a command. If test 324 is positive, in other words, if a command is received from the central host, the program will respond, depending on the command given. The commands possible at step 324 are listed as follows:

| | |
|---|---|
| D = Date | 1 = Time to call central host |
| T = Time | 2 = Primary call number |
| V = Version of Program | 3 = Second call number |
| L = Log of data | 4 = PC call number |
| F = Transfer files | I = Hotel ID |
| Q = Quit | U = Update |
| X = Transfer to host control of terminal | W = Write to disk |
| | R = Rename logs |
| G = Go execute back files | S = Space available on disk |

These commands are now described. These commands may be typed in at the keypad of the central host. If the command is a "D," the branch computer will send across its current date. If the command is a "T," the branch computer will send the time within the branch computer. The date and time of the branch computer are important because each transaction that takes place is time and date sensitive.

A "V" command prompts the branch computer to describe which version of the program is it currently using in the event that the branch computer needs to be updated. The "L" is a log count of the data. The branch computer responds with the number of times that the branch computer has received a call from the safe.

The "F" command is for file transfer and will prompt the branch computer to transmit all of its data into the central host, not changing the charges one log, etc., but simply sending the information to the central host. This information is not erased from the charges 0 log. The branch computer sends the same information over again when it arrives at its window.

A "Q" command causes the branch computer to quit (this is described hereafter). An "X" command sets up the branch computer into a program mode that allows the central host to transfer information. In the "X" mode, the central host has total control of the branch computer, so that the keypad and display at the central host look and act as if they were the keypad and the display of the branch computer. At this time, for example, new advertising messages can be sent to be stored in the safes.

A "1" command typed into the keypad at the central host and received at test 324 will prompt the branch computer to indicate the time of its window during which it is programmed to call the central host. The time can then be changed from the central host. A "2" command will prompt the branch computer to output its "primary call number," which is the first number programmed into the safes associated with the branch computer which the safes are programmed to call first when delivering information. A "3" command causes the output of the "secondary call number," which is the second number the safes are supposed to call. Both the primary and secondary call numbers can be changed from the central host. When the safes call into the branch computer and give a prompt asking if there is any new information, the branch computer will instruct the safes that they have a new primary and/or secondary phone number. These primary and secondary numbers are used in the event that there is a problem with the phone line between the safes and the branch computer.

Command "4" prompts the branch computer to divulge the PC call number, which is the number which the branch computer dials to unload its information each day. This number is also changeable. The "I" prompts the branch computer to transmit the hotel identification. A "U" command (update) is a command the central host gives if it is desired that any of the previous commands be changed. A "W" command prompts the branch computer to write the new information into the disk where it will be stored permanently.

The "S" command prompts the branch computer to indicate whether there is space available on the branch computer disk. The "R" prompts the branch computer to set the log count to zero. In other words, if the information has already been transferred pursuant to an "F" command, the "R" command allows the log count to be reset so that the branch computer will not transmit the same information again at the next window. A "G" command accesses the batch file, which is a file that may contain specific commands for the system and which can be changed at any time.

At step 326 the program waits for a "Q" command. At test 328 if a "Q" command is not given, the program loops back to test 324 to wait for another command. In other words, after each command which is not a "Q," the program loops back to step 324 to ask itself whether there is a command. The program then runs through steps 326 and 328 again until a "Q" command is recognized at test 328. If a "Q" command is recognized at test 328, step 330 will output a + + +, causing the system to disconnect from the central host and loop back via path 332 to step 262, looking to R/C/N.

Figure 7:
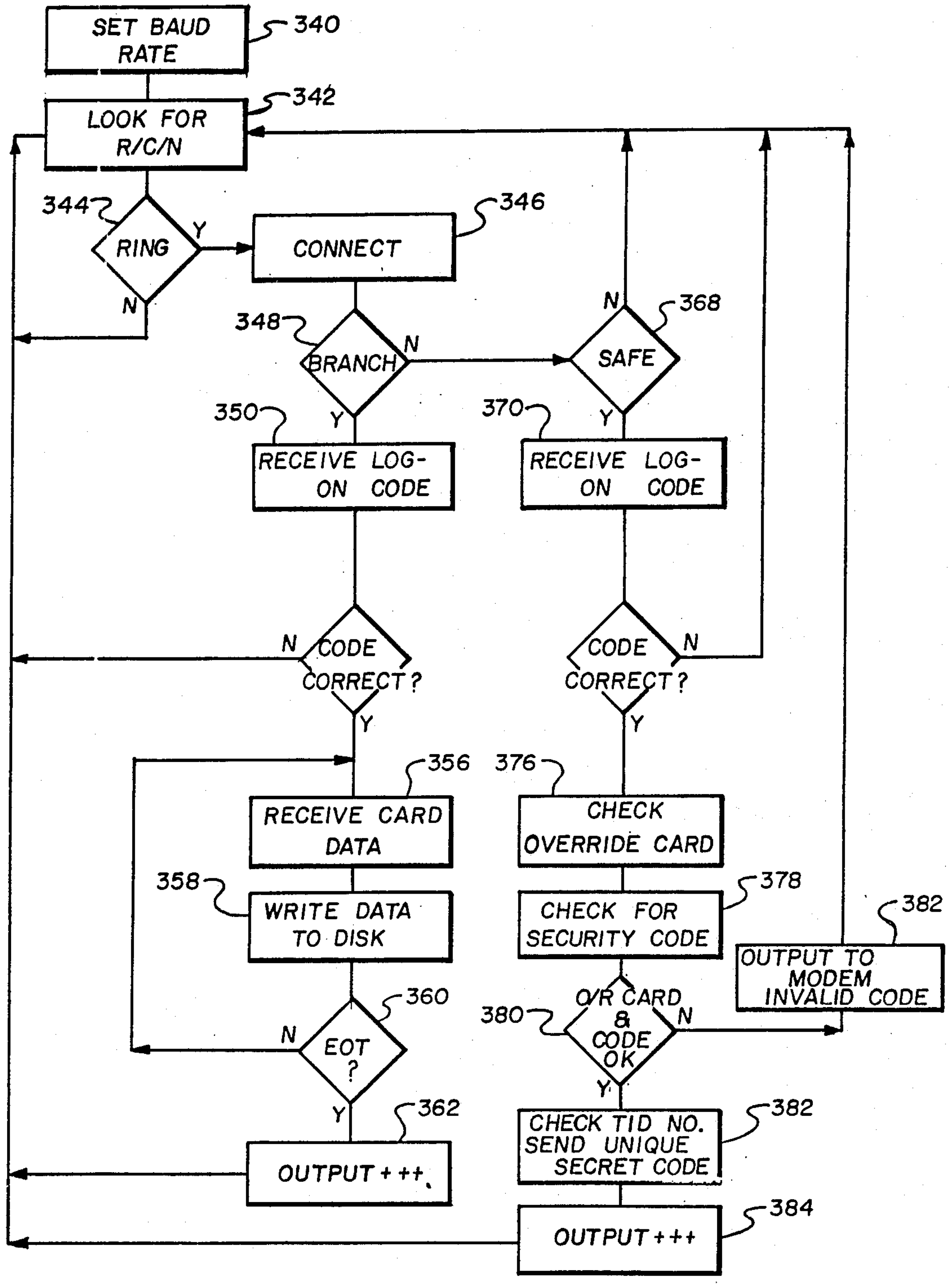
FIG. 7 is a flowchart of a receive-data mode of a central host of the invention.

FIG. 7 is a flow chart of the program at the central host in its "receive data mode." The central host incorporates a standard PC board, minimum 640K RAM. Typically, the system runs on one 3½ inch drive, one 5¼ inch drive, and a 30 megabyte hard drive. The branch computer may incorporate similar hardware. The central host incorporates a battery backup (UPS) and a clock and calendar. If the power goes down on the system, the clock and calendar are able to reset themselves and reload the program. Also, each time a branch computer communicates with the central host, if the branch computer date is off or if the time is more than five minutes different from the central host, the branch computer does an automatic update to correlate with the timer on the central host expander board. For example, if a branch computer's power has gone down, it will reset itself to the most current time and date at the central host.

Similar to the branch computer, the central host first sets a baud rate at step 340, after which it looks for an R/C/N at step 342. If at test 344 a ring is not detected, the program loops back to step 342 to again look for an R/C/N. If a ring is detected at test 344, step 346 executes connection with the calling computer.

The system then runs test 348, based on the incoming TID number, to determine whether it is a branch computer that has called. If test 348 is positive, in other words if it is a branch computer which has called, step 350 executes reception of the log-on code from the branch computer. The program then runs test 352 to ask if the log-on code is correct. If test 352 is negative, the program loops back to step 342. If step 342 is positive, step 356 executes reception of the data from the charges log of the branch computer.

Step 358 then causes the information to be written onto disc, where it is written into the charges data file of the central host. The program then runs test 360 to ask if an EOT (end of transmission) signal has been received. If test 360 is negative, the program loops back to step 356, and another data string is received and written to disk. If EOT test 360 is positive, step 362 will execute output of +++ to disconnect from the branch computer. The program then loops back to step 342 to again look for an R/C/N.

Referring now back to test 348, if test 348 is negative, in other words if the incoming call to the central host is not from a branch computer, the program will run test 368, based on the incoming TID number, to determine whether the call is coming in from a safe. If test 368 is negative, the program loops back to step 342 to look again for an R/C/N. If step 368 is positive, in other words if the incoming call is from a safe, step 370 executes reception of the log-on code. The program then runs test 372 to ask if the log-on code is correct. A negative at test 372 loops the program to step 342. A positive response at test 372 moves the program to step 376.

Step 376 checks to see if an override card has been entered into the safe. Step 378 checks if a security code has been received from the safe. Test 380 asks whether both the override card and the security code entered in at the safe keypad are correct. If either the card or the security code is incorrect, step 382 executes a message through the modem and hence to the safe display "invalid card" or "invalid code," respectively.

If the correct override card and the correct pass code have been properly entered, test 380 will be positive. Step 382 then checks the TID number of the safe which was sent across at step 368 and sends out a unique safe code to the safe which allows the safe to be opened. Step 384 executes output of +++ which disconnects. The program then loops back to step 342 to look for an R/C/N.

Figure 8:
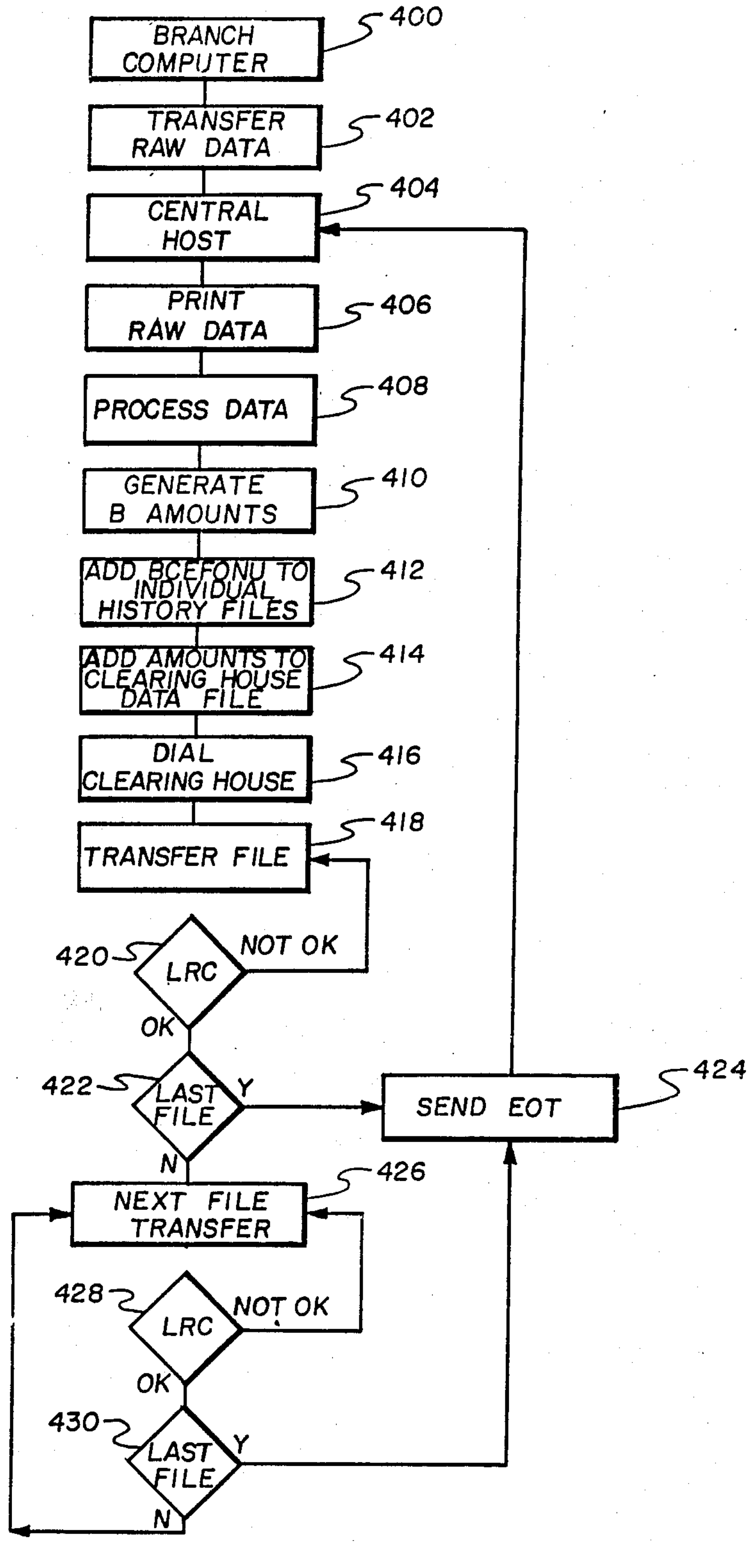
FIG. 8 is a flowchart of a data processing mode of a central host of the invention.

The data processing mode of the central host system is described in reference to FIG. 8. In functional block 400, the use information is stored in a branch computer. At functional block 402, the raw data (use information) is transferred to the central host. The activities of functional block 402 take place at steps 356, 358, and 360 of FIG. 7. At functional block 404, the raw data (use information) is stored in a "charges data" file at the central host computer. This file functions in the same manner as the charges data file of the branch computer, except that at the central host, there are nine days worth of information stored. This storage of information helps avoid problems that might develop, for example, should the information be lost or destroyed during or after processing. At functional block 406, a hard copy of the use information is printed from the charges data file.

At functional block 408, a copy of the use information is transferred from the computer which has received the information (a receiving computer) to a "process data" file of another computer (a processing computer). The information in the charges data file could be processed in the receiving computer; however, it is more convenient to remove the information from the receiving computer and process it in a separate computer to free up the receiving computer to communicate with branch computers or safes. For example, a safe may need to go through an override sequence. Whether one computer or a combination of computers is used to receive and process data, the single or combination of computers is referred to as the central host system or central host.

In the process data file, tee processing computer sifts the reservoir of information it has received and searches for any "B's" which were at the beginning of a data string when a user ran a credit card through a safe or any "C's" which were the beginning signal when a courtesy card was run through. These B's and C's are compared with "E's," which are sent across as the ending sequence of a B string, or an F, which means a free override use, or an 0, which means a charged override use. In the process data file, the computer compares new information it has received from the charges data file with data which has already been transferred in its unmatched data file. C's matched with an F or an O are placed into a C amounts file, which corresponds to uses of a courtesy card.

At step 410, if any of these two signal match, the computer processes the information into amounts to be charged. Any of the B's which are matched with E's, F's, or O's are placed in a B amounts file, which corresponds to uses of the computer with a standard credit card or charged uses of an override card. At step 412, B's, C's, E's, F's, O's, N's and U's are stored in a history file so that these files may be accessed and reviewed if necessary.

The B amounts file includes actual amounts that are to be billed and includes the credit card and other information necessary to bill the user. At step 414, the information in the B amounts file is placed in a credit card clearinghouse file, where it is converted into the exact format necessary to be transmitted to the credit card clearinghouse. The credit card clearinghouse is typically the National Data Corporation (NDC). A computer program has been developed to allow the credit card billing information to be transmitted electronically to NDC, where credit card billing statements are generated. Payment for use of the safe is handled between the credit card clearinghouse and the credit card companies. At step 416, the credit card clearinghouse is dialed.

At step 418, the information is electronically transferred in digital form through the phone system to the credit card clearinghouse. Each individual's use of a credit card safe is transferred individually as a separate file or string of data. As each credit card file is transferred, a draft capture takes place. A draft capture is essentially an electronic recognition that a file has been received and that a billing will take place.

After an individual file is transmitted, a longitudinal redundancy test 420 is performed. If test 420 is negative, the program returns to block 418 where the file is transferred again. If the LRC test is positive, in other words if the file has longitudinal redundancy, the program performs test 422, in which the program asks itself if this is the last file to be transmitted. If this is the last file to be transmitted, at functional block 424 an end of transmission (EOT) signal is transmitted to the credit card clearinghouse, and the program returns to functional block 404.

If the last file test 422 is negative, the program transfers the next file at block 426. The program then performs LRC test 428 and then again performs a last file test 430. The program thus continues to transmit each file until a last file test is positive, at which time the program loops to step 424 to send an EOT signal to the central host. The program would then loop back to step 404.

After all of the information is transferred, an authorization number for the entire block of information that is transmitted is received. Any individual billing information sets that are not authorized are separated into a special file to be resubmitted at a later time or to be analyzed to see if some of the information is not correct.

The illustrated embodiment is directed to a safe for storage of typically valuable or important items, such as money or important documents. However, the storage container may also be, for example, a refrigerator for the secure storage of expensive beverages or food. Alternatively, the "container" may be a large structure such as a rental storage unit for long-term storage of items.

The invention provides an access and billing system which may be particularly advantageous for the rental of hotel or motel rooms. A credit card reader, user input means, and user feedback means may be mounted on the outside of the room. A processor linked with a billing development means may be placed in each room.

The user accesses the system with his credit card and selects a desired combination, which functions as his key to enter the room. The user is billed for his use of the room on his credit card statement. The invention thus provides a system which eliminates the need to have personnel handle access to rooms. The system may be particularly convenient during late night or early evening hours when it may be inefficient to have personnel on duty to handle checking in of guests.

Similarly, rental of automobiles, boats, computers, or any other rentable item may be facilitated with an access and billing system of the invention. A processor may be mounted in the automobile or other item to control access through a credit card and/or entry of a user selected combination. With mobile devices, such as automobiles or boats, the processor may communicate with a billing development means, for example, through electromagnetic radiation, such as on a selected radio frequency.

Alternatively, a branch computer may be included with the rented item to store use information which may then be downloaded at a later time and translated into billing information by, for example, transmission of the use information to a central host.

The processor may also be programmed to charge the user on a mileage or hourly basis or some combination of mileage, hourly, or per diem basis. The processor may also be programmed to charge for use of fuel. Processors, such as processor 72 or 88 may be programmed to engage various devices such as mechanical motors, solenoids, or electrical switches.

The invention provides a system which may be used for providing a wide range of products or services. For example, a billing generating system of the invention may be linked with vending machines which dispense food or other consumer products, or with a ticketing machine which makes reservations and dispenses tickets for airline flights or train or bus trips.

Reference herein to details of the preferred embodiment is not intended to limit the scope of the claims, which themselves recite features considered to be important to the invention.

What is claimed is:

1. A credit card operable storage system, comprising:
- a secure container for storage of items;
- a door associated with said container;
- a locking mechanism associated with said door to selectively actuate between a locked position to lock said door in a closed position and an unlocked position to allow said door to open;
- a card reader associated with said container;
- a processor communicatively linked to said locking mechanism and said card reader, said processor being programmed to receive card information from said card reader, to open said locking mechanism based on appropriate card information, to develop use information, and to relay said use information to a billing development means; and
- a billing development means communicatively linked to said processor for receiving use information from said processor and for developing billing information.

2. A credit card operable storage system according to claim 1, wherein said container is a safe.

3. A credit card operable storage system according to claim 1, wherein said container is a refrigerator.

4. A credit card operable storage system according to claim 1, wherein said billing development means further comprises:
- a branch computer communicatively linked to said processor, said branch computer being programmed to receive use information from said processor and to relay said use information to a central host system; and
- a central host system (central host) communicatively linked to said branch computer, said central host being adapted to receive said use information from said branch computer and to develop said billing information.

5. A credit card operable storage system according to claim 4 wherein said container is a safe.

6. A credit card operable storage system according to claim 4 wherein said container is a refrigerator.

7. A credit card operable storage system according to claim 4, wherein said branch computer is programmed to store said use information in memory and to periodically relay said use information to said central host.

8. A credit card operable storage system according to claim 4, wherein said central host is programmed to relay said billing information in digital form to a billing statement generating system.

9. A credit card operable storage system according to claim 1, further comprising a user input means associated with said container and communicatively linked with said processor for providing user input to said processor, wherein said processor is programmed to receive and store a user-selected combination entered in at said user input means, and wherein said processor is programmed to open said locking mechanism based on input of said user-selected combination at said user input means.

10. A credit card operable storage system according to claim 9, wherein said container is a safe.

11. A credit card operable storage system according to claim 10 wherein said safe is refrigerated.

12. A credit card operable storage system according to claim 9, wherein said container is a refrigerator.

13. A credit card operable storage system, comprising:

a secure container adapted for the storage of items;

a door associated with said container;

a locking mechanism associated with said door and adapted to actuate between a locked position to lock said door in a closed position and an unlocked position in which said door is free to open;

a card reader associated with said container and adapted to read card information from a credit card;

a processor associated with said container and communicatively linked to said locking mechanism and said card reader, said processor being programmed to receive card information from said card reader, to open said locking mechanism based on reception of appropriate card information, to develop use information, and to relay said use information to a branch computer;

a branch computer communicatively linked to said processor, said branch computer being programmed to receive and store use information from said processor and to periodically relay said use information to a central host computer; and a central host system (central host) communicatively linked to said branch computer, said central host being adapted to receive use information from said branch computer and to develop billing information based on said use information.

14. A credit card operable storage system according to claim 13, further comprising a user input means associated with said container and communicatively linked with said processor for providing user input to said processor, wherein said processor is programmed to receive and store a user-selected combination entered in at said user input means, and wherein said processor is programmed to open said locking mechanism based on input of said user-selected combination at said user input means.

15. A credit card operable storage system according to claim 14, wherein said container is a safe.

16. A credit card operable storage system according to claim 15, wherein said container is a refrigerator.

17. A credit card operable storage system according to claim 15, wherein said user input means is a keypad associated with said safe and electronically linked with said processor.

18. A credit card operable storage system according to claim 17, wherein said branch computer is programmed to store use information received from said processor and to periodically relay said use information to said central host.

19. A credit card operable storage system according to claim 18, wherein said branch computer is programmed to initiate contact with said central host.

20. A credit card operable storage system according to claim 19, wherein said central host is adapted to transmit said billing information electronically to a billing statement generating system.

* * * * *